(No Model.)
H. H. LOCKWOOD.
BOLT.
No. 363,074. Patented May 17, 1887.
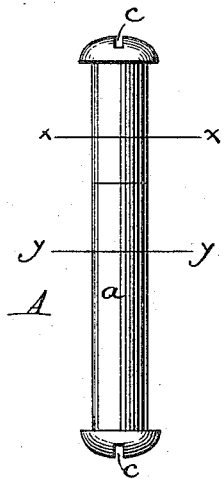
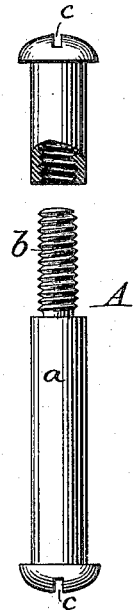
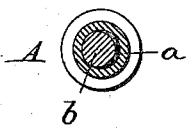
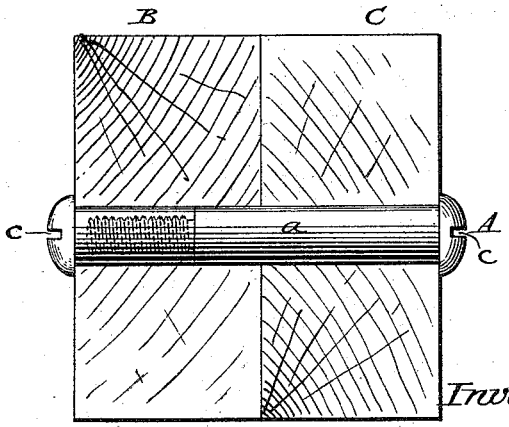
Attest.
Sidney P. Hollingsworth
W. R. Kennedy.
Inventor.
H. H. Lockwood,
By his Atty
P. T. Dodge

UNITED STATES PATENT OFFICE.

HENRY H. LOCKWOOD, OF ROCHESTER, ASSIGNOR OF ONE-HALF TO JEREMIAH SMITH, OF GATES, NEW YORK.

BOLT.

SPECIFICATION forming part of Letters Patent No. 363,074, dated May 17, 1887.

Application filed January 24, 1887. Serial No. 225,359. (No model.)

*To all whom it may concern:*

Be it known that I, HENRY H. LOCKWOOD, of Rochester, in the county of Monroe and State of New York, have invented certain Improvements in Bolts, of which the following is a specification.

The aim of this invention is to provide a bolt which shall present when inserted a finished head at both ends, and which, being inserted through a hole of uniform diameter, will hold the two or connected parts securely in position.

To this end it consists in a bolt having finished heads at both ends, the body of the bolt being of cylindrical form, divided midway of its length, and the two parts united by a neck formed on the one section and entering a threaded hole in the other.

In the accompanying drawings, Figure 1 presents a side view of improved bolt. Fig. 2 is a side view of the same with its two parts separated or disconnected. Figs. 3 and 4 are cross-sections on the lines $xx$ and $yy$, respectively. Fig. 5 is a vertical section showing the bolt as it appears when in use.

Referring to the drawings, A represents the bolt having a body, $a$, of cylindrical form throughout its length, and provided with a hemispheric or other ornamental head at each end. The body of the bolt is divided transversely at any suitable point in its length, one portion being provided with a central externally-threaded neck, $b$, and the other portion provided with an internal hole or opening adapted to receive the neck. I provide the two heads with transverse slots $c$, to receive screw-drivers, or otherwise form them to admit of their being turned by suitable means.

The manner in which my bolt is used is clearly shown in Fig. 5, the two parts B and C, which are to be united, being provided with a hole of uniform diameter through them, from side to side, of a size corresponding to that of the bolt. The two parts of the bolt are then inserted in opposite ends of the hole, and screwed one into the other until the two pieces to be connected are drawn firmly together. Owing to the fact that the threaded portion is solid and the bolt provided with two heads, it presents an ornamental or finished appearance, and is peculiarly applicable for use in furniture and other places in which an exposed nut or washer would be objectionable. The cylindrical form of the bolt adapts it to bear firmly in the seat or hole from one end to the other, and thus to prevent the parts from slipping or working laterally one upon the other.

Having thus described my invention, what I claim is—

1. The herein-described bolt having a body of cylindrical form, consisting of two sections, one provided with a threaded neck of reduced diameter and the other with an internally-threaded hole to receive the same, both sections provided with finished or ornamental closed heads.

2. The improved bolt consisting of two cylindrical portions, each provided with a round or finished head at the outer end, and the two united by a threaded neck formed on one part and seated in the other, as described and shown.

In testimony whereof I hereunto set my hand, this 15th day of January, 1887, in the presence of two attesting witnesses.

HENRY H. LOCKWOOD.

Witnesses:
 JAS. M. BRUFF,
 OTIS PEASE.